(12) United States Patent  (10) Patent No.: US 9,185,894 B1
Almubaelesh et al.  (45) Date of Patent: Nov. 17, 2015

(54) AUTOMATIC FISH HOOK TYING DEVICE

(71) Applicants: Abdulrahman KH. Almubaelesh, Safat (KW); Meshari Al-Dhouwihi, Safat (KW); Abdulaziz KH Almubaelesh, Safat (KW)

(72) Inventors: Abdulrahman KH. Almubaelesh, Safat (KW); Meshari Al-Dhouwihi, Safat (KW); Abdulaziz KH Almubaelesh, Safat (KW)

(*) Notice: Subject to any disclaimer, the term of this patent is extended or adjusted under 35 U.S.C. 154(b) by 0 days.

(21) Appl. No.: 14/710,545

(22) Filed: May 12, 2015

(51) Int. Cl.
| A01K 97/00 | (2006.01) |
| A01K 83/00 | (2006.01) |
| A01K 91/04 | (2006.01) |
| A01K 97/26 | (2006.01) |
| A01K 97/28 | (2006.01) |
| A01K 99/00 | (2006.01) |
| A01K 85/08 | (2006.01) |
| B65H 69/04 | (2006.01) |
| A01K 97/06 | (2006.01) |

(52) U.S. Cl.
CPC ............. *A01K 97/26* (2013.01); *A01K 83/00* (2013.01); *A01K 85/08* (2013.01); *A01K 97/00* (2013.01); *A01K 97/06* (2013.01); *A01K 97/28* (2013.01); *A01K 99/00* (2013.01); *B65H 69/04* (2013.01)

(58) Field of Classification Search
CPC ....... A01K 97/00; A01K 91/04; A01K 83/00; A01K 99/00; A01K 97/06; B65H 2701/355; B65H 69/04
USPC ............ 43/4, 57.1, 43.16, 44.83; 289/2, 18.1, 289/17
See application file for complete search history.

(56) References Cited

U.S. PATENT DOCUMENTS

| 1,951,222 | A | * | 3/1934 | Torrence | ................. | A01K 83/00 43/4 |
| 2,145,439 | A | * | 1/1939 | Torrence | ................. | A01K 91/04 289/18.1 |
| 2,220,530 | A | * | 11/1940 | Lauterbach | ............ | A01K 91/04 289/18.1 |
| 2,236,503 | A | * | 4/1941 | Heidrich | ................... | B21F 1/06 43/44.83 |
| 2,246,217 | A | * | 6/1941 | Noling | ................... | B65H 69/04 289/2 |
| 2,332,655 | A | * | 10/1943 | Miles | ..................... | A01K 97/28 43/4 |
| 2,601,605 | A | * | 6/1952 | Fulvio | .................... | A01K 91/04 289/17 |
| 2,734,299 | A | * | 2/1956 | Masson | .................. | A01K 91/04 43/4 |
| 2,843,961 | A | * | 7/1958 | Semple | .................. | A01K 91/04 289/17 |
| 2,856,970 | A | * | 10/1958 | Benedict | ................ | A01K 91/04 289/17 |
| 2,865,665 | A | * | 12/1958 | Messa | ..................... | B65H 69/04 289/17 |
| 3,106,417 | A | * | 10/1963 | Clow | ..................... | A01K 91/04 289/17 |
| 3,166,346 | A | * | 1/1965 | Gotz | ..................... | B65H 69/04 289/2 |

(Continued)

FOREIGN PATENT DOCUMENTS

| GB | 2226742 A | * | 7/1990 | ............. | A01K 91/03 |
| GB | 2236648 A | * | 4/1991 | ........... | A01K 91/047 |

(Continued)

*Primary Examiner* — Darren W Ark
(74) *Attorney, Agent, or Firm* — Richard C. Litman

(57) ABSTRACT

The automatic fish hook tying device includes a hollow housing with an elongate slot formed therein. A fish hook holding assembly near one end of the slot adjustably holds a fish hook thereon, with an eye of the fish hook extending into the housing. A fishing line feeding assembly near the opposite end of the slot positively feeds a fishing line through a fishing line guide assembly, threading the line through the eye. A winding and spooling assembly winds the line around a detachable spool and forms coils around a standing line to initiate formation of a knot. A manipulator assembly carries the spool to form loops and thread the line through the loops during the knot tying process. Upon completion of the knot, the tied fishing hook can be removed from the housing through the slot. A cutter assembly is provided to cut off excess length of line.

20 Claims, 15 Drawing Sheets

(56) References Cited

U.S. PATENT DOCUMENTS

| | | | |
|---|---|---|---|
| 3,252,724 A * | 5/1966 | Kearns | A01K 91/04 289/17 |
| 3,321,225 A * | 5/1967 | Miller | A01K 91/04 289/17 |
| 3,520,566 A * | 7/1970 | Bovigny | A01K 9/04 289/17 |
| 3,521,918 A * | 7/1970 | Hammond | A01K 91/04 289/17 |
| 3,630,555 A * | 12/1971 | Newlin | D04G 1/00 289/17 |
| 3,667,790 A * | 6/1972 | Taylor et al. | A01K 91/04 289/17 |
| 3,712,651 A * | 1/1973 | Shockley | A01K 91/04 289/17 |
| 3,734,285 A * | 5/1973 | Messa | B65H 69/04 289/2 |
| 3,837,691 A * | 9/1974 | Smythe | A01K 91/04 289/17 |
| 3,877,737 A * | 4/1975 | Chappell | A01K 91/04 289/17 |
| 3,893,254 A * | 7/1975 | Nack | A01K 91/04 289/17 |
| D247,713 S * | 4/1978 | Etes | D22/149 |
| 4,101,152 A * | 7/1978 | Gardipee | A01K 91/04 43/4 |
| 4,105,228 A * | 8/1978 | Messa | B65H 69/04 289/2 |
| 4,188,052 A * | 2/1980 | Browning | D04G 5/00 289/17 |
| 4,336,960 A * | 6/1982 | Seki | A01K 91/04 43/4 |
| 4,401,328 A * | 8/1983 | Yamada | A01K 91/04 289/18.1 |
| 4,403,797 A * | 9/1983 | Ragland, Jr. | A01K 91/04 43/4 |
| 4,417,756 A * | 11/1983 | Herke | A01K 97/28 289/2 |
| 4,573,719 A * | 3/1986 | Aldridge | A01K 91/04 289/17 |
| 4,613,173 A * | 9/1986 | Rosser | A01K 91/04 289/17 |
| 4,660,314 A * | 4/1987 | Janssen | A01K 97/00 43/4 |
| 4,697,370 A * | 10/1987 | Vissing | A01K 91/04 289/17 |
| 4,714,281 A * | 12/1987 | Peck | A01K 91/04 289/17 |
| 4,870,772 A * | 10/1989 | Johns | A01K 97/26 43/4 |
| 4,871,200 A * | 10/1989 | Ryder | A01K 91/04 289/17 |
| 5,098,137 A * | 3/1992 | Wardall | A01K 91/04 289/17 |
| 5,197,217 A * | 3/1993 | Browning | A01K 91/04 43/4 |
| 5,240,295 A | 8/1993 | Spencer | |
| 5,383,695 A * | 1/1995 | Couper | A01K 91/04 289/17 |
| 5,647,616 A * | 7/1997 | Hamilton | A01K 97/06 289/17 |
| 5,829,798 A * | 11/1998 | Little | A01K 91/04 289/17 |
| 6,322,112 B1 * | 11/2001 | Duncan | A01K 91/04 43/4 |
| 6,419,283 B1 * | 7/2002 | Thomas | B65H 65/005 289/2 |
| 6,427,377 B1 * | 8/2002 | Kim | A01K 97/06 43/4 |
| 6,485,307 B1 * | 11/2002 | Mestyanek | G09B 19/24 434/258 |
| 6,526,690 B2 * | 3/2003 | Dillard | A01K 91/04 43/4 |
| 6,641,181 B2 * | 11/2003 | Thomas | B65H 65/005 289/2 |
| 6,702,339 B1 * | 3/2004 | Geozalian | A01K 91/04 43/4 |
| 6,715,804 B2 * | 4/2004 | Beers | A01K 91/04 43/4 |
| 7,309,086 B2 * | 12/2007 | Carrier | A01K 91/04 289/17 |
| 7,419,195 B1 * | 9/2008 | Jochum | D03J 3/00 289/17 |
| 7,510,220 B1 * | 3/2009 | Wood | A01K 91/04 289/17 |
| 7,568,738 B1 | 8/2009 | Snoop | |
| 7,677,613 B2 | 3/2010 | Chermanski | |
| 7,793,458 B2 * | 9/2010 | Eisbrenner | A01K 87/007 43/4 |
| 7,793,459 B1 * | 9/2010 | Ruzicka | A01K 91/04 43/57.1 |
| 8,146,286 B2 * | 4/2012 | Wood | A01K 91/04 43/4 |
| 8,511,721 B1 * | 8/2013 | Farner | A01K 91/04 289/17 |
| 8,511,722 B1 * | 8/2013 | Farner | A01K 91/04 289/17 |
| 8,573,656 B1 | 11/2013 | Zhang et al. | |
| 8,794,680 B2 * | 8/2014 | Frew | A01K 91/04 289/17 |
| 2007/0182157 A1 | 8/2007 | Carrier | |
| 2007/0193104 A1 * | 8/2007 | Molyneux | A01K 91/04 43/4 |

FOREIGN PATENT DOCUMENTS

| | | | | |
|---|---|---|---|---|
| JP | 02234624 A | * | 9/1990 | |
| JP | 06014683 A | * | 1/1994 | |
| JP | 2005160444 A | * | 6/2005 | |
| JP | 2006238739 A | * | 9/2006 | |
| JP | 2007075016 A | * | 3/2007 | |
| JP | 2009165458 A | * | 7/2009 | |
| JP | 2009178097 A | * | 8/2009 | |
| WO | WO 2005072521 A1 | * | 8/2005 | A01K 91/04 |
| WO | WO 2010/039020 A1 | | 4/2010 | |

* cited by examiner

AUTOMATIC FISH HOOK TYING DEVICE

BACKGROUND OF THE INVENTION

1. Field of the Invention

The present invention relates to fishing accessories, and particularly to an automatic fish hook tying device that automatically ties a fishing line to a fish hook.

2. Description of the Related Art

Fishing is an enjoyable pastime, which may be enjoyed as a leisurely solitary activity, with friends and family, or as a sport. Much of the conventional fishing performed with a hook and line involves a great amount of patience and knowledge as to the typical behavior of fish and their habitat. One of the skills acquired for fishing is in the equipment and the use thereof.

For conventional hook and line or angling fishing, the fisherman should be skilled in the art of tying a fish hook to the fishing line. Various knots are available to securely tie the fish hook, and one of the oft-used types of knot is a slip knot, similar to the one used in a hangman's noose. This type of knot provides a very secure connection to the eye of the fish hook and strengthens the line near the eye. The secure knot assists in preventing the line from snapping off at the hook, especially during instances of vigorous activity from the hooked fish.

Unfortunately, very few fishermen know how to tie such knots, or they are not dexterous enough for the task. The knot tying can also be a time consuming process for the more experienced. Many solutions have been advanced to assist the fisherman in this process, but most involve a type of bracket that functions as an aid or passive guide that assists the user in tying the knot, rather than an active device that actually performs the knot tying process. There is still a need for more relatively easy, and preferably automated, means of tying a fish hook to a line. Thus, an automatic fish hook tying device solving the aforementioned problems is desired.

SUMMARY OF THE INVENTION

The automatic fish hook tying device includes a hollow housing with an elongate slot formed therein. A fish hook holding assembly near one end of the slot adjustably holds a fish hook thereon, with an eye of the fish hook extending into the housing. A fishing line feeding assembly near the opposite end of the slot positively feeds a fishing line through a fishing line guide assembly, threading the line through the eye. A winding and spooling assembly winds the line around a detachable spool and forms coils around a standing line to initiate formation of a knot. A manipulator assembly carries the spool to form loops and thread the line through the loops during the knot tying process. Upon completion of the knot, the tied fishing hook can be removed from the housing through the slot. A cutter assembly is provided to cut off excess length of line.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
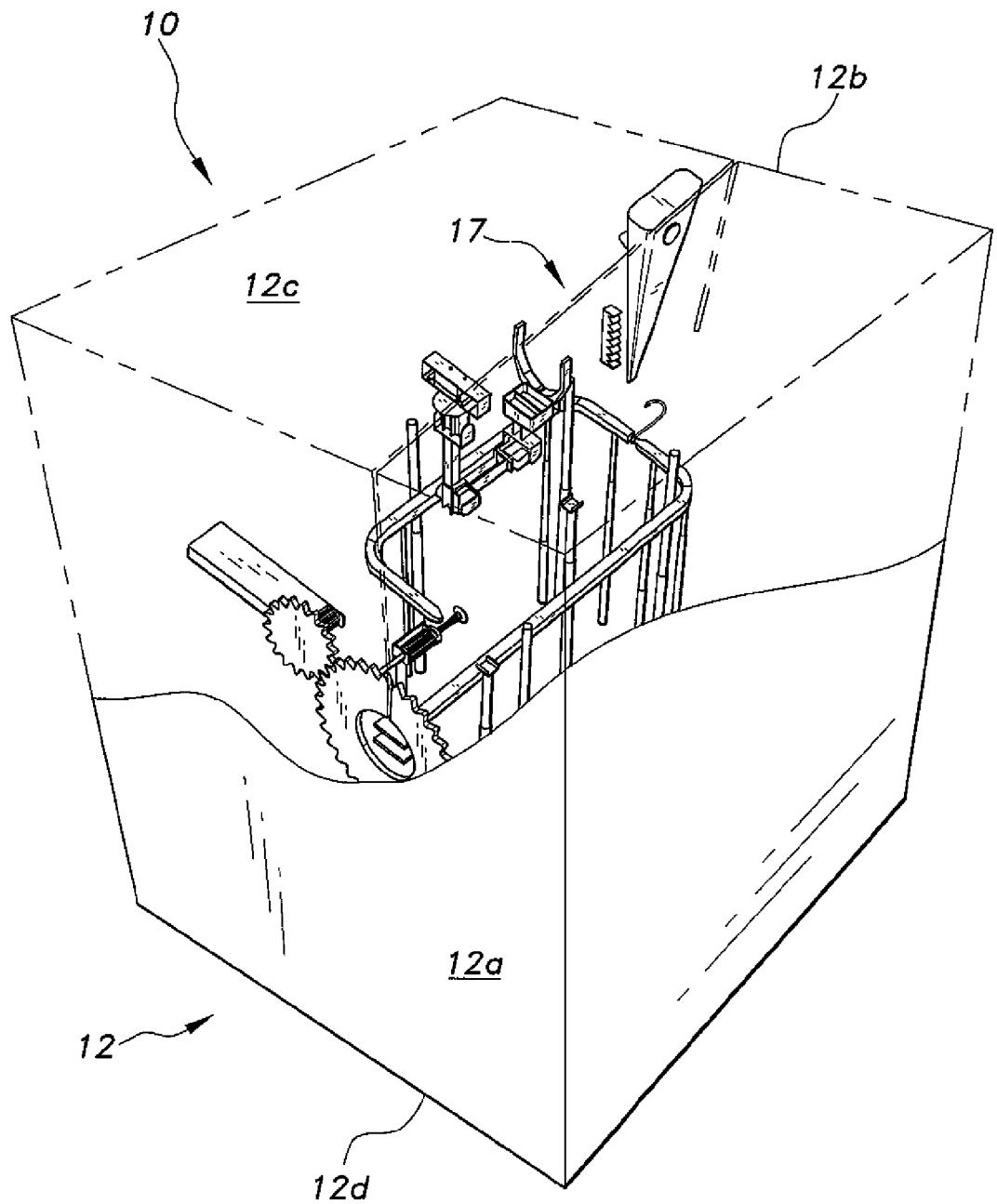
FIG. 1 is an environmental, perspective view of an automatic fish hook tying device according to the present invention with part of the housing cutaway to show the inner components.

The automatic fish hook tying device, generally referred to by the reference numeral 10 in the Figures, provides an automated means of tying a knot onto the eye of a fish hook. As noted above, many types of slip knots are usually employed in tying the fish hook. One example of a slip knot is a jam knot, and the automatic fish hook tying device 10 facilitates automatic tying of this knot.

Multiple steps are involved in tying the jam knot. As best shown in FIGS. 2A-2D, the fishing line L is threaded through the eye HE of a fish hook H to loop back and wind around a standing line SL, the standing line SL being the line that remains stationary during a knot tying process, and form several coils C thereon. This process also forms a first loop L1 near the eye HE. Referring to FIG. 2B, after the coils C have been formed, the free end is looped back towards the eye HE and threaded through the first loop L1, leaving enough line to form a second loop L2. To make the tie of the knot, the free end is wrapped around the standing line SL and threaded through the second loop L2 as shown in FIG. 2C. Pulling the free end, as shown in FIG. 2D and the pulling direction P, completes the jam knot by forcing the coils C towards the eye HE while a knot is tied between the coils C.

Figure 3:
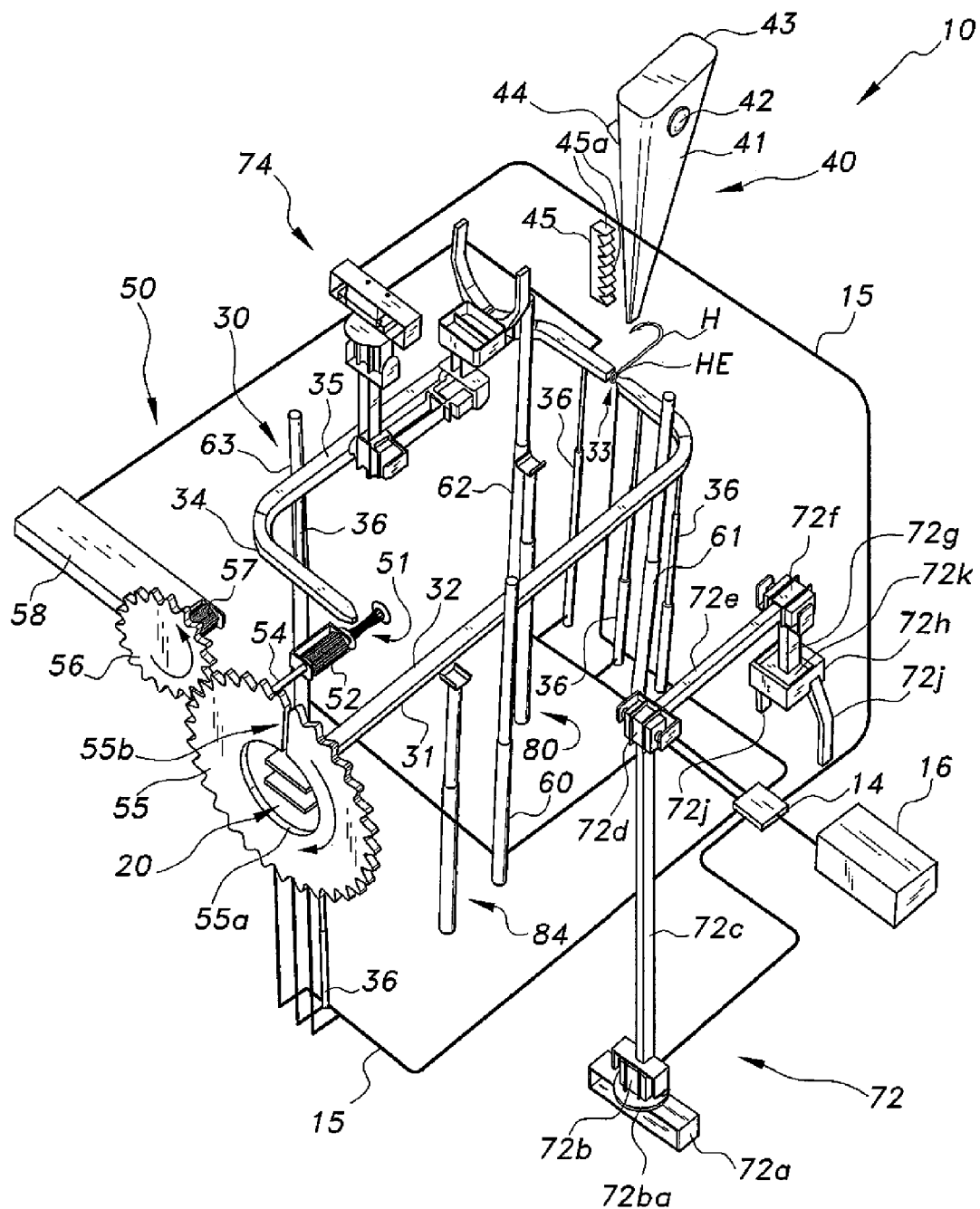
FIG. 3 is a perspective view of the automatic fish hook tying device shown in FIG. 1 with the housing removed for clarity.

Due to the multiple steps described above, the automatic fish hook tying device 10 includes a plurality of subsystems or assemblies to facilitate the multiple steps for constructing a jam knot. As best shown in FIGS. 1 and 3, the automatic fish hook tying device 10 includes a housing 12 to house and protect the interior components of the hook tying device. The housing 12 is preferably shaped as a box for simplicity and portability. It is to be noted that the shape of the housing 12 can be any desired shaped that conforms to user requirements and aesthetics. A controller 14 is disposed inside the housing 12 to control operation of the various assemblies. The controller 14 can be a microprocessor and the like. The controller 14 is coupled to a power source, such as a battery 16, to power the controller 14 and the assemblies, and wires or communication lines 15 extend from the controller 14 to link with the subsystems and communicate therewith. The power source can also be a direct connection to an outlet.

The housing 12 includes an elongate slot 17 extending from one sidewall 12a to an opposite sidewall 12b of the housing 12. The elongate slot 17 facilitates setup of the fish hook H for tying the knot and removal of the hook H and line L when the knot has been completed.

The automatic fish hook tying device 10 includes a fishing line feeding assembly 20 disposed on one interior side of the housing 12. The fishing line feeding assembly 20 feeds a fishing line L to a fishing line guide assembly 30 to form a general beginning shape for tying the jam knot. Most conventional fishing lines are monofilament cords constructed from artificial materials such as nylon, polyethylene, polyvinylidene fluoride (PVDF), and the like, which exhibit high strength, buoyancy, and other characteristics suitable for angling fish. As such, these fishing lines tend to be relatively stiff compared to similar sized cords made from natural materials. The automatic fish hook tying device 10 exploits this relative stiffness characteristic to ease feeding of the fishing line L.

Figure 4:
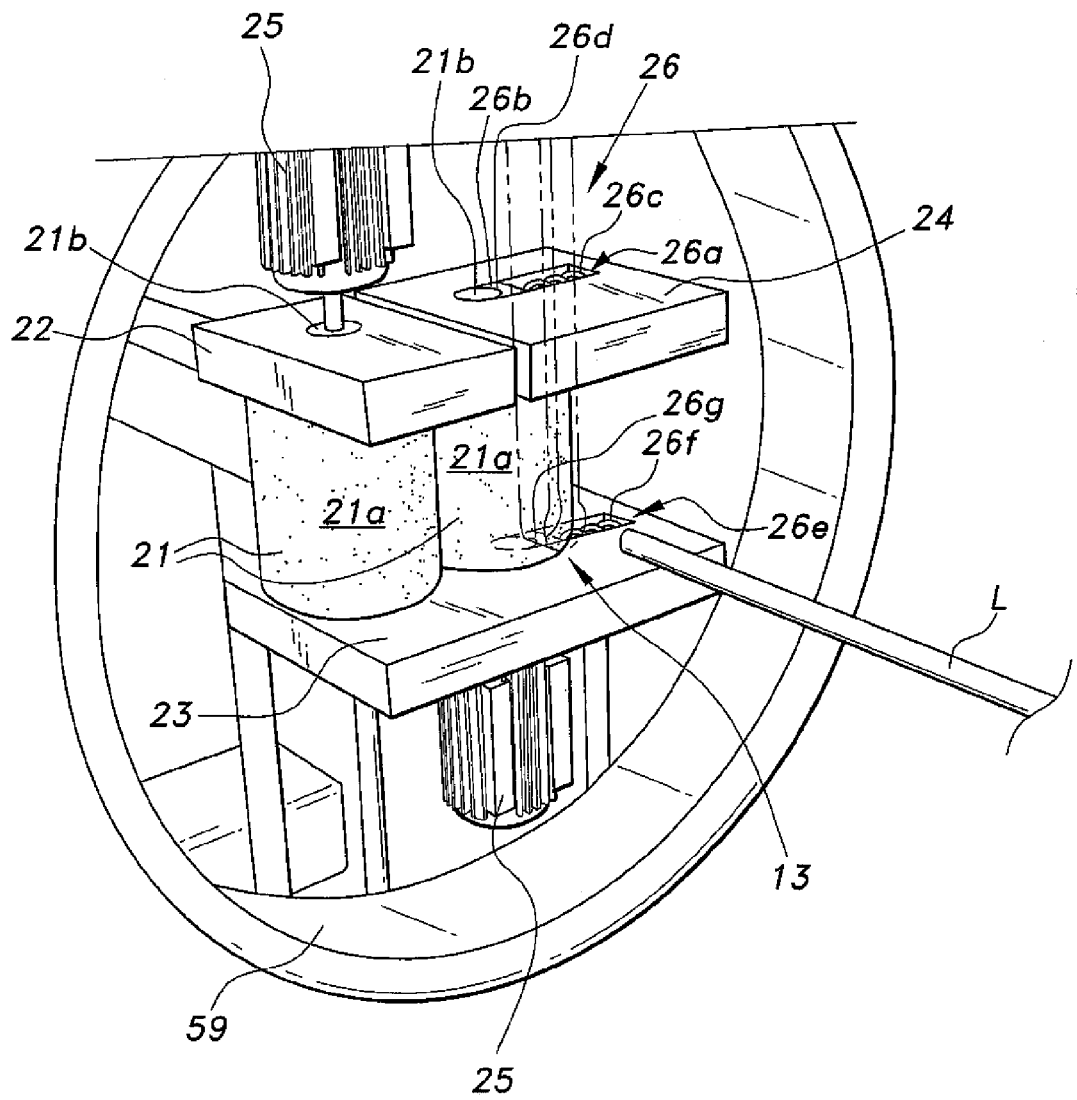
FIG. 4 is a detailed perspective view of a fishing line feeding assembly in the automatic fish hook tying device shown in FIG. 3 with communication lines removed for clarity.

As best seen in FIG. 4, the fishing line feeding assembly 20 includes a pair of driven, rotating feed rollers 21 forming a nip therebetween. The housing 12 includes a slotted opening 13 through which an end of the fishing line L is fed towards the nip of the feed rollers 21. A feed roller frame rotatably supports the feed rollers 21 and includes an upper first plate 22, an upper second plate 24, and a lower base plate 23, where the first upper plate 22 and the second upper plate 24 supports the upper end of the feed rollers 21 and the lower base plate 23 supports the lower end of the feed rollers 21. Each feed roller 21 is preferably provided with a gripping surface 21a to enhance gripping and feeding of the fishing line L. The gripping surface 21a can be constructed as a layer of increased friction such as rubber, elastomers, and the like; textured such as with protrusions of various shapes and sizes; or a combination thereof.

Each feed roller 21 is coupled to a corresponding drive motor 25. The respective drive motor 25 selectively drives the corresponding feed roller 21 in response to commands from the controller 14. Upon activation of the controller 14, the feed rollers 21 can be automatically activated by introduction of the fishing line L into the nip or by sensors (not shown). These drive motors 25 can be servomotors.

To further insure proper feeding of the fishing line L, at least one of the feed rollers 21 is preferably self-adjustable. Referring to FIG. 4, a biasing mechanism 26 is coupled to one of the feed rollers 21. In an embodiment, the biasing mechanism 26 includes an elongate slot 26a formed on one of the upper support plates, e.g., the second support plate 24. A slidable abutment block 26b reciprocates within the elongate slot 26a, and a spring 26c is coupled to the abutment block 26b to bias the abutment block 26b towards one end of the slot 26a. The abutment block 26b is preferably shaped to conform to the interior dimensions of the slot 26a and be slidable therein. The abutment block 26b also includes a recess 26d which abuts against one end of a roller shaft 21b of the corresponding feed roller 21. The bottom support plate 23 also includes a similar elongate slot 26e with a corresponding spring 26f and an abutment block 26g to support the opposite end of the roller shaft 21b. Thus, the biasing mechanism 26 supports opposite ends of the roller shaft 21b and biases one feed roller 21 against the other.

In use, the biasing mechanism 26 allows the feed roller 21 and connected drive motor 25 to automatically adjust the nip to accommodate fishing lines L of various diameters or dimensions. Moreover, the biasing mechanism 26 insures that there is constant contact of the feed roller 21 with the fishing line L being fed.

The fishing line feeding assembly 20 feeds the fishing line L directly into the fishing line guide assembly 30. As best seen in FIGS. 3 and 5-7, the fishing line guide assembly 30 includes an interrupted guide rail extending from the fishing line feed assembly 20. The guide rail includes a first guide rail section 31 extending along one side of the housing 12 and about halfway around an adjacent side of the housing 12 and a second guide rail section 34 extending around the other sides of the housing 12 to form a substantially complete loop around the interior of the housing 12.

Each guide rail section 31, 34 is generally an elongate, U-shaped rail forming an open channel for the fishing line L to slide thereon during feeding. Each first guide rail section 31 and second guide rail section 34 is generally covered by a respective pivoting first guide rail section cover 32 and second guide rail section cover 35. Each guide rail section covers 32, 35 serve to enclose the respective guide rails sections 31, 34 so as to confine feeding movement of the fishing line L within the guide rails. A gap 33 exists between the first guide rail section 31 and the second guide rail section 34. The gap 33 provides space for the eye HE of the fish hook H to protrude into the housing 12 from the outside.

The fish hook H is held in the desired position by a fish hook holding assembly 40 disposed on the sidewall 12b of the housing 12 opposite from the fishing line feeding assembly 20. The fish hook holding assembly 40 includes an elongate, adjustable fish hook holder 41 slidably mounted to the sidewall 12b. The fish hook holder 41 can slide on one or more guide rails (not shown) disposed on the sidewall 12b near the slot 17. A position locking mechanism, such as a retractable pin 44, is coupled to the fish hook holder 41, and the retractable pin 44 interacts with an elongate adjustment rail 45 to set or lock the relative position of the fish hook holder 41 along the sidewall 12b.

The fish hook holder 41 is preferably constructed as an elongate wedge-shaped block with an elongate, sloping edge 43 on one side. The sloping edge 43 is rounded or curved so as to permit the hook of the fish hook H to securely hook onto the sloping edge 43 by accommodating the curve of the hooked section of a fish hook. Moreover, this construction provides support for fish hooks H of various sizes and lengths. The fish hook holder 41 can be vertically adjusted by selective operation of a button or actuator 42, which causes the retractable pin 44 to retract upon depression of the actuator 42 or extend upon release of the same.

The adjustment rail 45 is preferably an elongate rack with a plurality of teeth 45a formed thereon. Selective operation of the pin 44 engages a select tooth 45a to thereby fix the relative position of the fish hook holder 41. The teeth 45a can be arranged at preselected regular or irregular intervals. The rounded sloping edge 43 also permits minor positional adjustments of the fish hook H along the sloping edge 43 for those instances where the intervals may not be optimal to adequately hold or support the fish hook H thereon. When properly supported and held by the fish hook holder 41, the tail end of the fish hook H containing the eye HE extends into the interior of the housing 12 so that the eye HE is placed within the gap 33 with the opening of the eye HE aligned with the channels of the first guide rail section 31 and the second guide rail section 34.

As the fishing line L is fed through the fishing line guide assembly 30, the fishing line L travels across or transitions the gap 33 between the first guide rail section 31 and the second guide rail section 34. This transition also threads the fishing line L through the eye HE of the fish hook H. To insure the fishing line L properly threads through the eye HE, the exit end of the first guide rail section 31 can be tapered to direct the leading end of the fishing line L towards the eye HE.

Each first guide rail section 31 and second guide rail section 34 includes one or more telescoping support posts 36 mounted inside the housing 12. In an embodiment, a plurality of telescoping support posts 36 is coupled to the first guide rail section 31 and second guide rail section 34. These support posts 36 facilitate selective raising and lowering of the of the corresponding guide rail section 31, 34 in response to commands from the controller 14.

Figure 5:
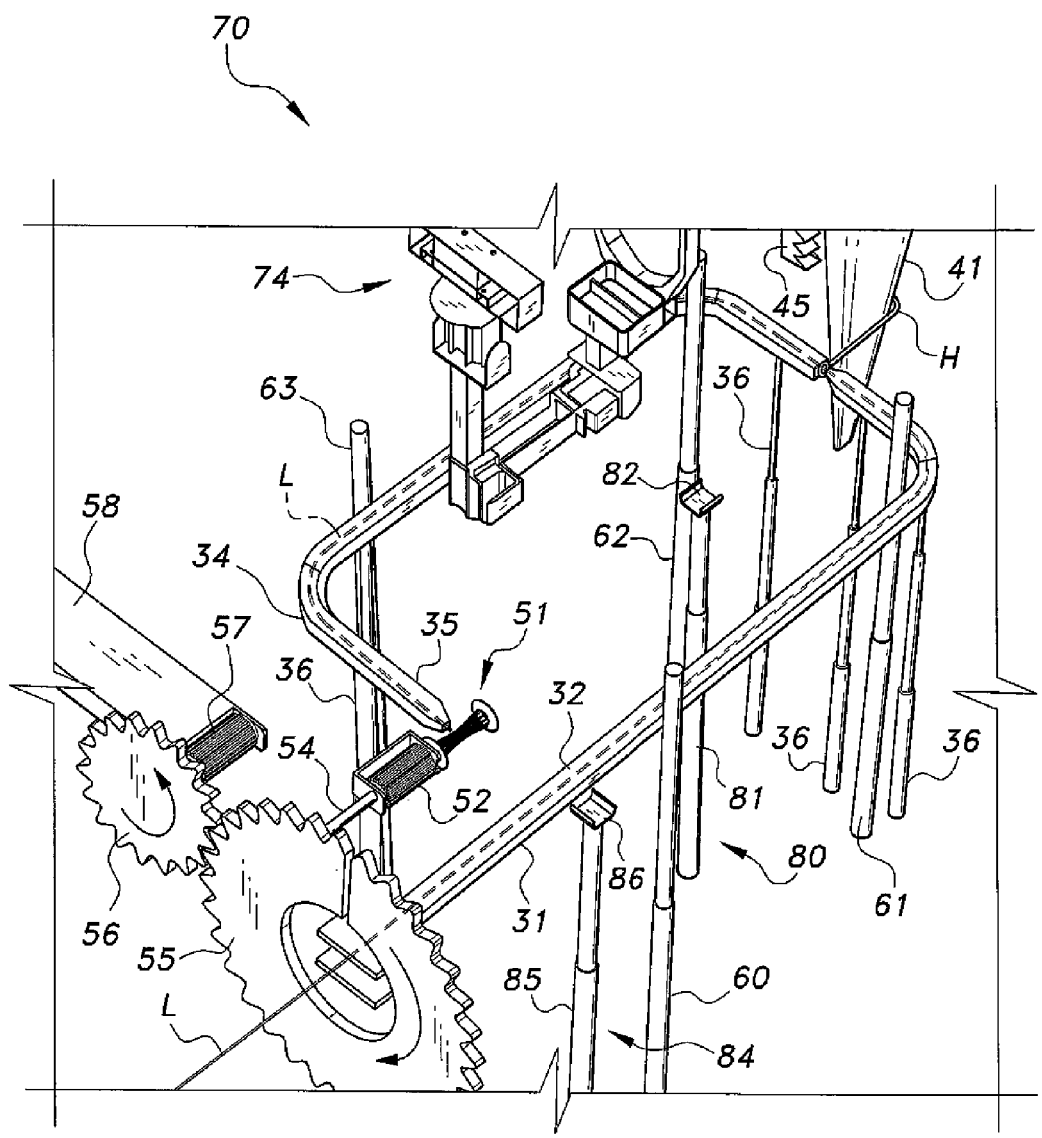
FIG. 5 is a detailed perspective view of a fishing line guide assembly in the automatic fish hook tying device shown in FIG. 3 with communication lines removed for clarity.
Figure 6:
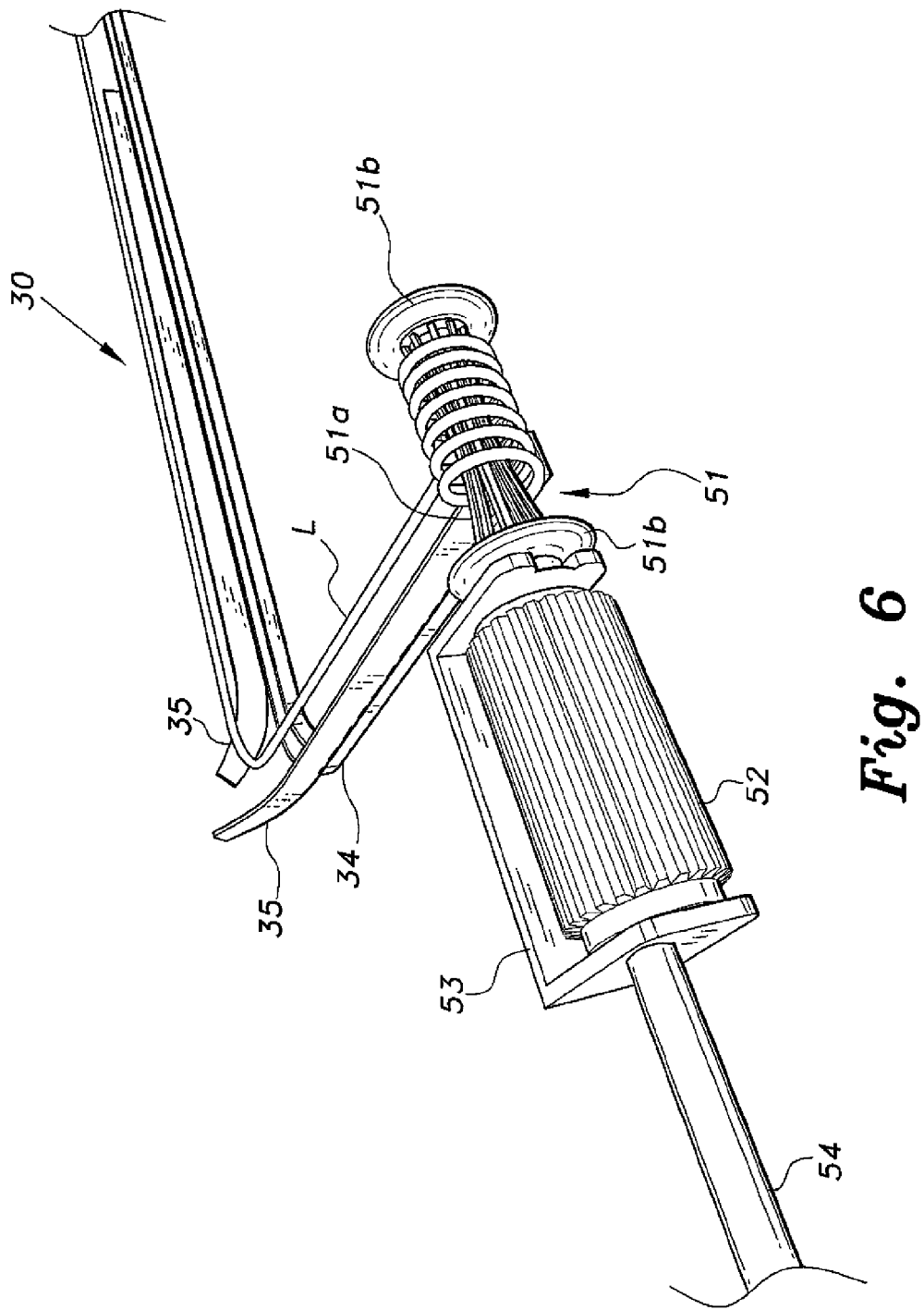
FIG. 6 is a detailed perspective view of a portion of a spooling and winding assembly in the automatic fish hook tying device shown in FIG. 3 with communication lines removed for clarity.

As best seen in FIGS. 3, 5, and 6, a spooling and winding assembly 50 is disposed near the exit end of the second guide rail section 34. The spooling and winding assembly 50 includes a spool 51 detachably coupled to a spool motor 52. The spool motor 52 is supported within a bracket 53. The bracket 53 is fixedly attached to a driven winding gear 55 by an elongate first post, beam, or bar 54 extending axially from one side or face of the driven winding gear 55 at an offset or eccentric position from the axis of the driven winding gear 55. The spool motor 52 selectively drives and rotates the spool 51 to wind the fishing line L onto the spool 51, and selective rotation of the driven winding gear 55 winds the fishing line L around the standing line SL to form a select number of coils C thereon.

The spool 51 includes a cage shaft 51a supported between opposing hubs 51b. The cage shaft 51a is constructed from a plurality of slats arranged in a circular pattern to form a generally cylindrical shaft with gaps between the slats. In use, as the leading end of the fishing line L feeds into the spool 51, the fishing line L enters the cage shaft 51a through one of the gaps. Subsequent rotation of the spool 51 by the spool motor 52 causes a leading portion of the fishing line L to catch between the slats and anchor the fishing line L for the spooling operation. The motor 52 is stopped once a suitable number of windings have been completed to insure that the fishing line L is secured onto the spool 51. To insure that the leading end of the fishing line L enters the cage shaft 51a, the exit end of the second guide rail section 34 can also be tapered to control the direction of entry.

The spooling and winding assembly 50 also includes a drive gear 56 coupled to the driven winding gear 55. A drive motor 57 is mounted to a distal end of an elongate second beam or bar 58 extending inside the housing 12, and the output shaft of the drive motor 57 is connected to the drive gear 56. Selective operation of the drive motor 57 rotates the drive gear 56, which subsequently rotates the driven winding gear 55. The drive gear 56 is preferably smaller in diameter than the driven winding gear 55 so that several revolutions of the drive gear 56 is required to facilitate one revolution of the driven winding gear 55, i.e., a greater than 1:1 gear arrangement. This relationship between the gears 55, 56 assists in accommodating the relatively small size and power capacity of the drive motor 57 and maintain output within operational parameters of the drive motor 57. It is also noted, however, that any sized motor and gear arrangement can be utilized as long as they can facilitate selective rotation of the driven winding gear 55.

The driven winding gear 55 has a relatively large diameter compared to the drive gear 56, and the driven winding gear 55 includes a relatively large central bore 55a and an elongate radial slot 55b extending from the bore 55a to the circumference of the driven winding gear 55. The central bore 55a provides space or opening for introduction of the fishing line L towards the fishing line feeding assembly 20, while the radial slot 55b permits removal of the fishing line L from the housing 12 back through the elongate slot 17 upon completion of the knot. With regards to the latter, the driven winding gear 55 is normally positioned so that the radial slot 55b is collinear with the elongate slot 17 on the housing 12. The revolutions that the driven winding gear 55 undergoes is preferably programmed or electromechanically arranged so that the radial slot 55b is collinear with the elongate slot 17 at the start and finish of the desired or preselected number of revolutions. The driven winding gear 55 can be rotatably supported on the sidewall 12a by any conventional means known in the art, such as a slotted hollow shaft or hub extending from the sidewall 12a and the like.

In use, the spool 51 is activated by the motor 52 until the fishing line is securely wound around the cage shaft 51a with the desired length of fishing line L. The spool 51 is mainly used as a carrier to be manipulated for constructing the desired knot and the length thereof is inclusive of the length needed to construct the knot as well as being secured to the spool 51. However, the spool 51 is fully capable of winding a relatively large quantity of fishing line L thereon by changing operational parameters of the motor 52, such as the number of revolutions. After being wound on the spool 51, the driven winding gear 55 is rotated by the drive motor 57 rotating the intermeshed drive gear 56. The rotation of the driven winding gear 55 carries the spool 51 in a circular motion due to the connection to the elongate first beam 54 and winds the fishing line L around the standing line SL extending from the fishing line feeding assembly 20. The windings with the driven winding gear 55 create coils C around the standing line SL. At this time, the standing line SL remains taught by cessation of the feed rollers 21 and the normal clamping force at the nip. It is preferable that the coil forming process be facilitated by unspooling of the fishing line L during the revolutions of the driven winding gear 55. Alternatively, the coil forming can be facilitated by stopping the feed rollers 21, which stops positive feeding, and permitting passive feed of the fishing line L as the spool 51 revolves around the standing line SL and pulls more fishing line L as needed to form the coils C. Either method maintains suitable tension in the standing line SL to permit coiling.

In order to facilitate the winding process with the driven winding gear 55, the fishing line guiding assembly 30 should be moved out of the way. Otherwise, the fishing line guiding assembly 30 will interfere with the winding process. Thus, the telescoping support posts 36 are activated to lower the first guide rail section 31 and the second guide rail section 34, the normally raised position shown in, e.g., FIG. 5 and the lowered position shown in FIGS. 7-13. The first guide rail section cover 32 and the second guide rail section cover 35 can be constructed as one or more panels each pivotally mounted to the top of the respective first guide rail section 31 and the second guide rail section 34 by one or more suitable hinges, such as a living hinge, dual leaf hinge, and the like. During lowering of the respective guide sections 31, 34, the covers 32, 35 automatically open as the fishing line L remains stationary and abut against the covers 32, 35. This is facilitated by the stationary fishing line L forcing the covers 32, 35 to pivot upwardly as the guide rail sections 31, 34 lower, and further lowering of the guide rail sections 31, 34 towards the interior floor of the housing 12 frees the fishing line L from the fishing line guiding assembly 30.

While the removal of the fishing line guide assembly 30 frees the fishing line L, the fishing line L is not supported sufficiently to maintain the shapes needed to construct the knot. Thus, the automatic fish hook tying device 10 includes a plurality of elongate, telescoping guide posts 60, 61, 62, 63, otherwise referred to as a first guide post 60, a second guide post 61, a third guide post 62, and a fourth guide post 63, disposed around the interior base of the housing 12 along the path of the curvilinear first guide rail section 31 and the curvilinear second guide rail section 34. During the coiling process and substantially simultaneous freeing of the fishing line L from the fishing line guiding assembly 30, the spool 51 pulls the fishing line L for a certain length which causes the fishing line L to become taut and wrap around the second guide post 61 and third guide post 62 thereby maintaining a general loop shape of the fed line. This taut loop or first loop L1 is maintained within a general horizontal plane.

Figure 7:
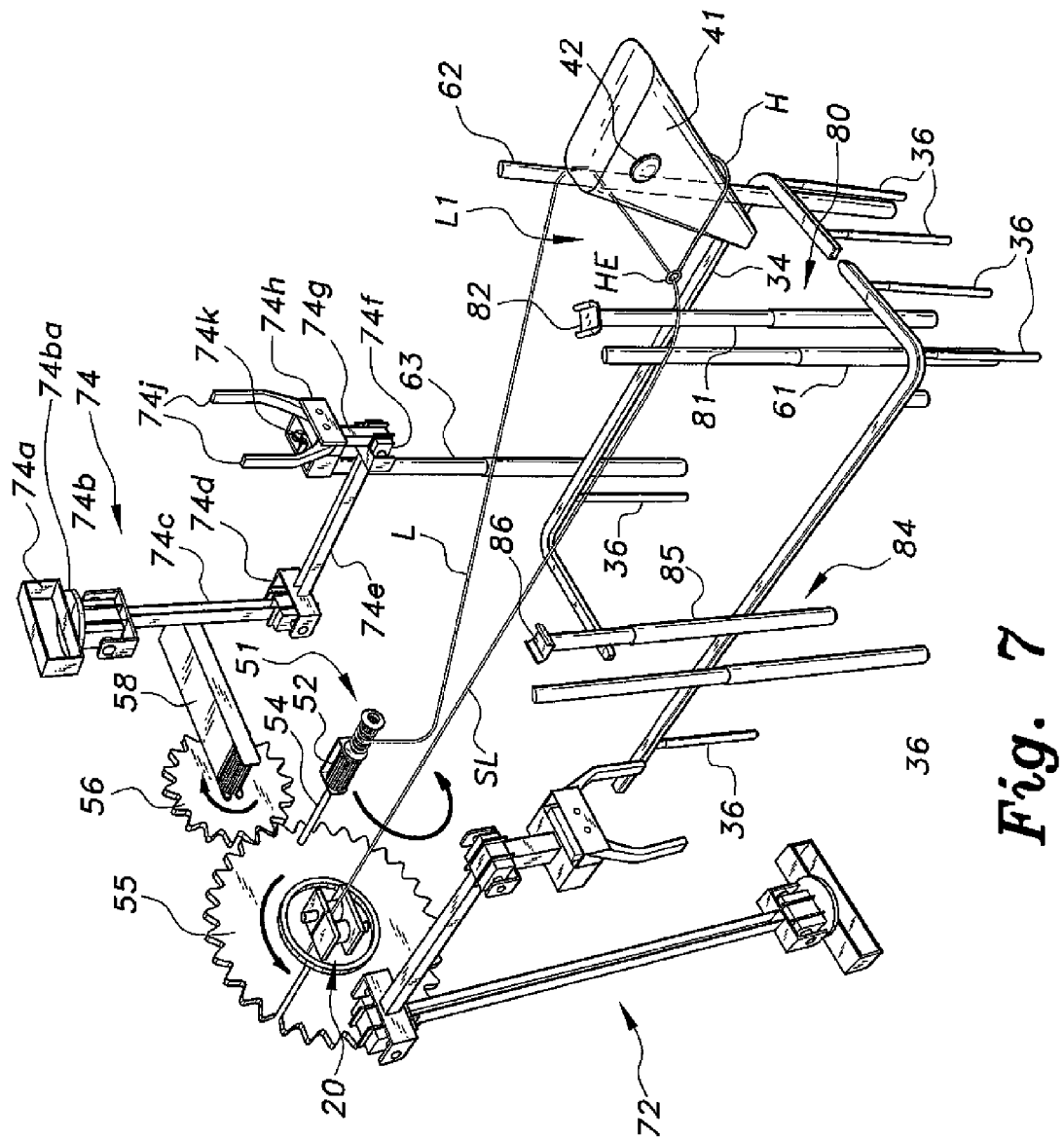
FIG. 7 is a detailed perspective view of an initial step in a coiling process for the automatic fish hook tying device shown in FIG. 3 with communication lines removed for clarity.

To further the knot tying process, the automatic fish hook tying device 10 includes a manipulator assembly 70 disposed inside the housing 12, the operations of the manipulator assembly 70 being controlled by the controller 14. As best seen in FIGS. 3, 5, and 7, the manipulator assembly 70 includes a first manipulator 72 and a second manipulator 74. In an embodiment, the first manipulator 72 is coupled to the floor or bottom sidewall 12d of the hosing 12, and the second manipulator 74 is coupled to the ceiling or top sidewall 12c of the housing 12. These manipulators 72, 74 facilitate transfer of the spool 51 from one station to another and threading of the knot.

The first manipulator 72 is preferably a robotic arm with an elongate first member 72c coupled to a base 72a, an elongate second member 72e pivotally connected to the first member 72a at one end, one end of an elongate third member 72g pivotally connected to the second member 72e at the opposite end of the second member 72e, and a handling mechanism coupled to the opposite end of the third member 72g. The first member 72c is preferably coupled to the base 72a to provide at least two degrees of movement to the first member 72c. The at least two degrees of movement include pivotal movements of the first member 72c with respect to the base 72a, the pivotal movements being about a horizontal axis, and rotation of the first member 72c with respect to the base 72a, the rotation being about a vertical axis. These movements can be facilitated by a first servomotor 72b mounted to a rotatable turntable 72ba and the like.

The second member 72e also includes a second servomotor 72d that allows for controlled pivoting movements of the second member 72e with respect to the first member 72c. By this construction, the first member 72c and the second member 72e can fold and unfold with respect to each other and rotated so as to place the first manipulator 72 at the desired position.

A third servomotor 72f facilitates pivoting movements of the third member 72g with respect to the second member 72e. The handling mechanism includes a pair of pincers or jaws 72j pivotally mounted to the handling member 72h so that the distal ends of the pincers 72j can pivot toward or away from each other to grasp or release a desired object. The handling member 72h includes a motor or drive assembly 72k to selectively pivot the pincers 72j. In an embodiment, the pincers 72j can also be constructed to reciprocate with respect to each other for similar grasping and releasing functions.

The second manipulator 74 is similarly constructed as the first manipulator 72, except the lengths of at least the first member 74c, the second member 74e, and third member 74g are shorter compared to the first manipulator 72. Thus, the operational area or zone for each manipulator 72, 74 is different, e.g., the operational zone for the first manipulator 72 is larger than the second manipulator 74. The dimensions of the manipulators 72, 74 can be varied to accommodate various sized zones of operation as required or desired. It is noted that due to the similar construction between the first manipulator 72 and the second manipulator 74, a more detailed description of the features of the second manipulator 74 has not been specifically set forth for brevity. However, the second manipulator 74 is distinguished by the use of the reference number "74" and a series of alphanumeric designations.

The automatic fish hook tying device 10 includes a first rest station 80 and a second rest station 84 providing temporary resting structures for the spool 51 during intermediate steps of forming the knot. The first rest station 80 includes an elongate, telescoping resting post 81 with a spool rest 82 mounted on top of the resting post 81. In an embodiment, the spool rest 82 is preferably an elongate, open-ended trough where the cage shaft 51a can rest thereon. The length of the spool rest 82 is preferably as long as or shorter than the length of the cage shaft 51a so that the opposing hubs 51b of the spool 51 can straddle the ends of the spool rest 82. This construction will assist in insuring that the spool 51 will not be inadvertently dislodged from the spool rest 82.

The second rest station 84 is similarly constructed as the first rest station 80 and includes an elongate, telescoping resting post 85 with a spool rest 86 mounted on top of the resting post 85. The first rest station 80 is preferably disposed near the gap between the first guide rail section 31 and the second guide rail section 34, and the second rest station 84 is preferably disposed near the exit end of the second rail guide section 34. The extended length of each rest station 80, 84 is preferably below the horizontal plane of the loop.

Figure 2A:
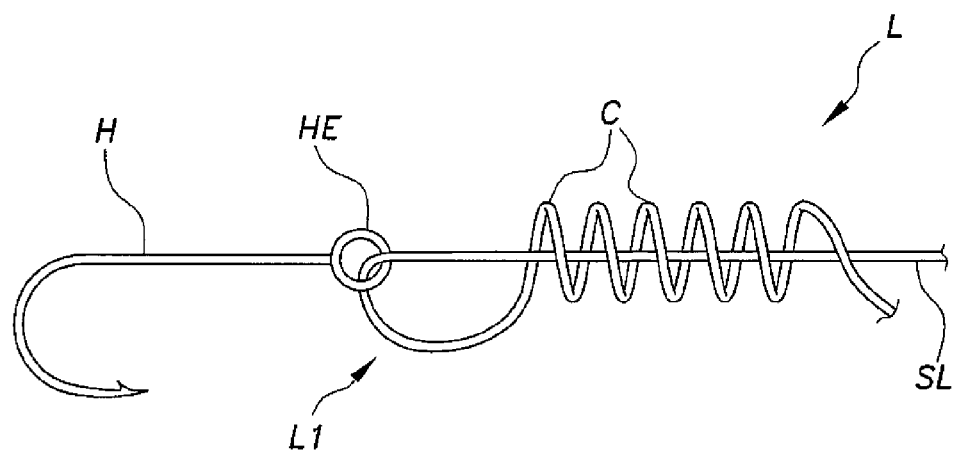
FIGS. 2A, 2B, 2C, and 2D are diagrammatic views of a jam knot process facilitated by the automatic fish hook tying device according to the present invention.
Figure 2B:
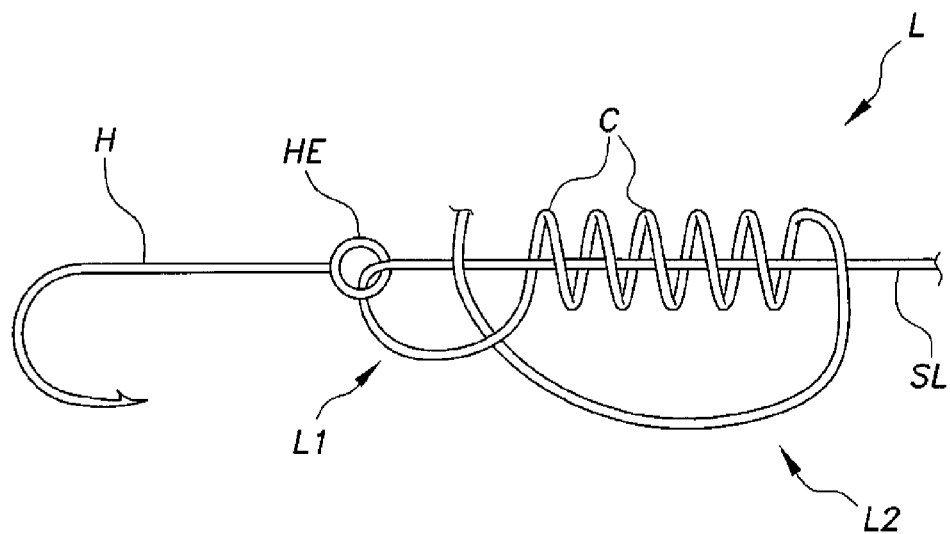
Figure 2C:
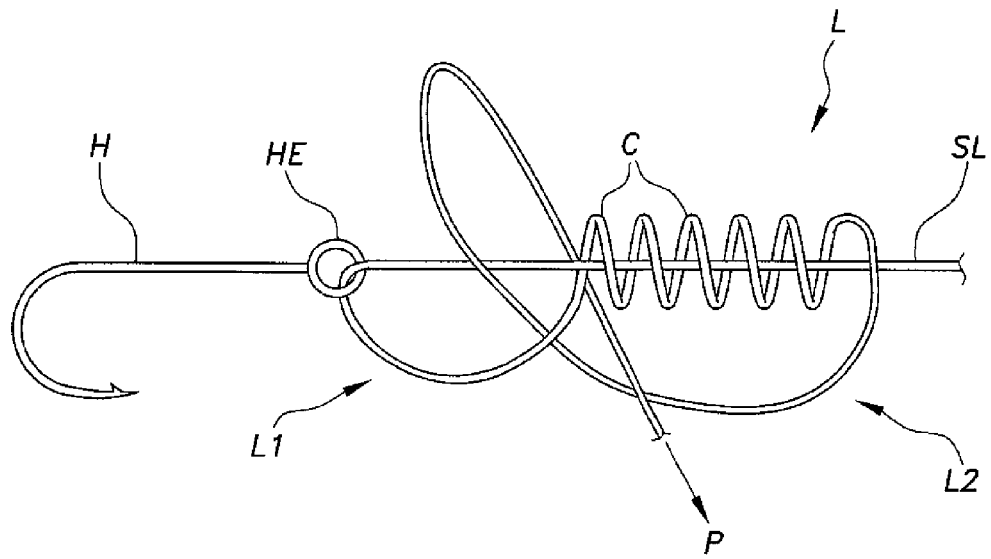
Figure 2D:
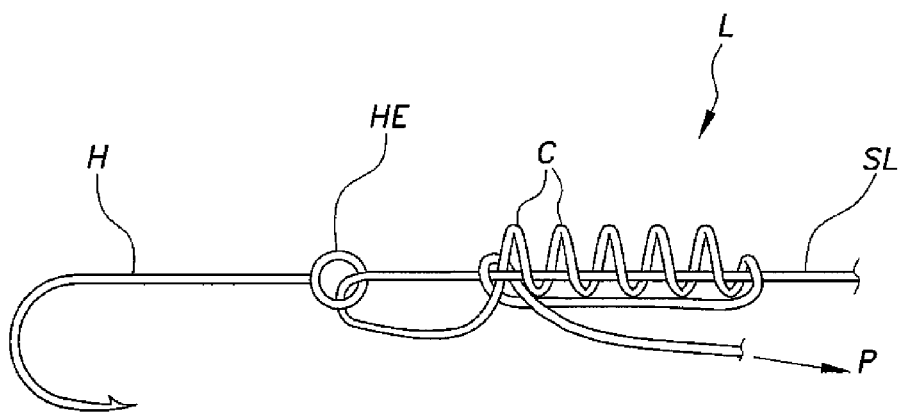
Figure 8:
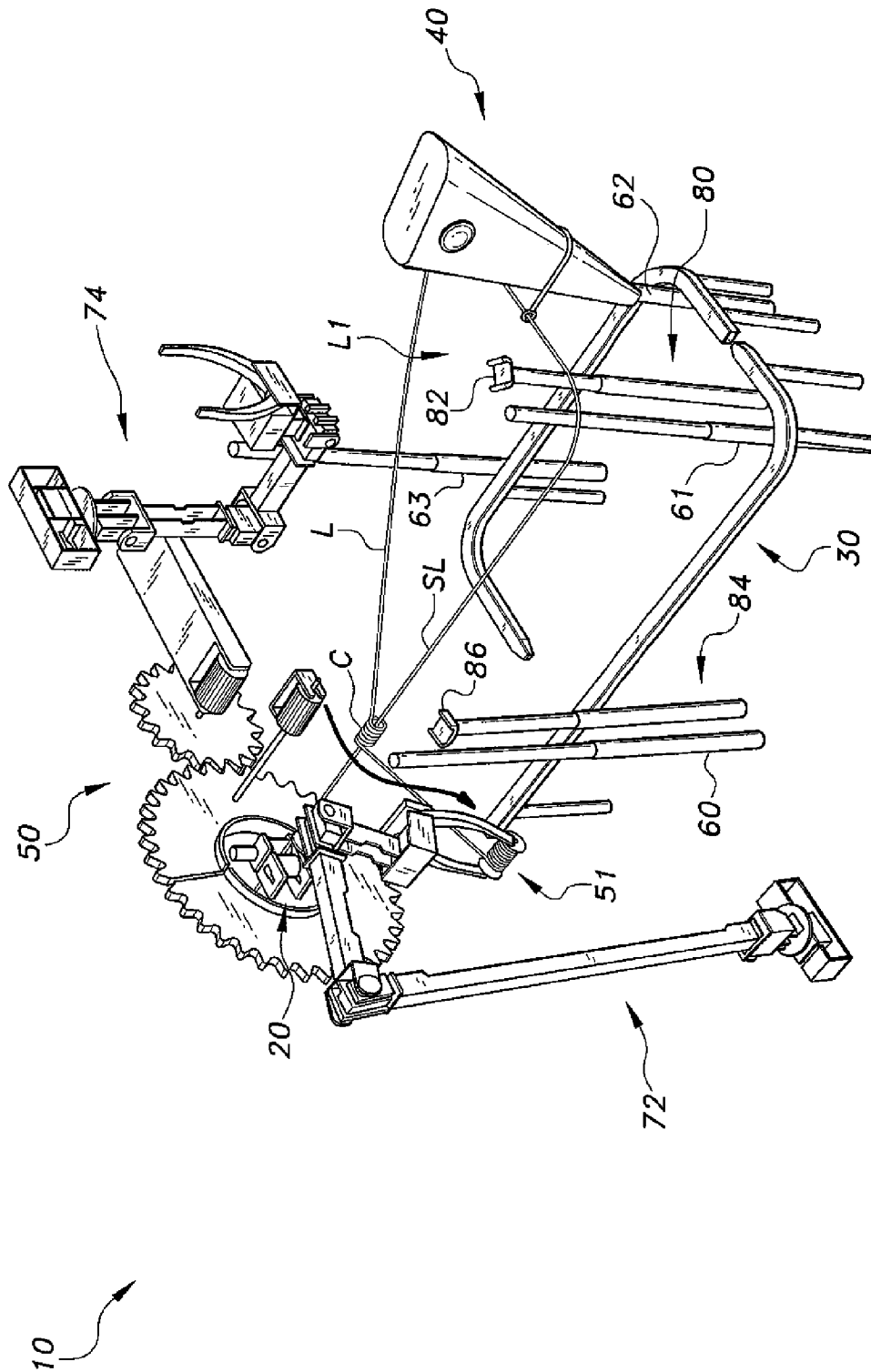
FIG. 8 is a detailed perspective view of an initial step of forming a first loop in the automatic fish hook tying device shown in FIG. 3 during the process of tying a knot, the communication lines being removed for clarity.

Operation of the manipulator assembly 70 does not occur until after the coil forming process shown in FIGS. 7 and 8, which corresponds to the manual process shown in FIG. 2A. The following describes the use of the manipulator assembly 70 for tying the jam knot with reference to FIGS. 9-14 and their correspondence with the manual process shown in FIGS. 2A-2D.

Figure 9:
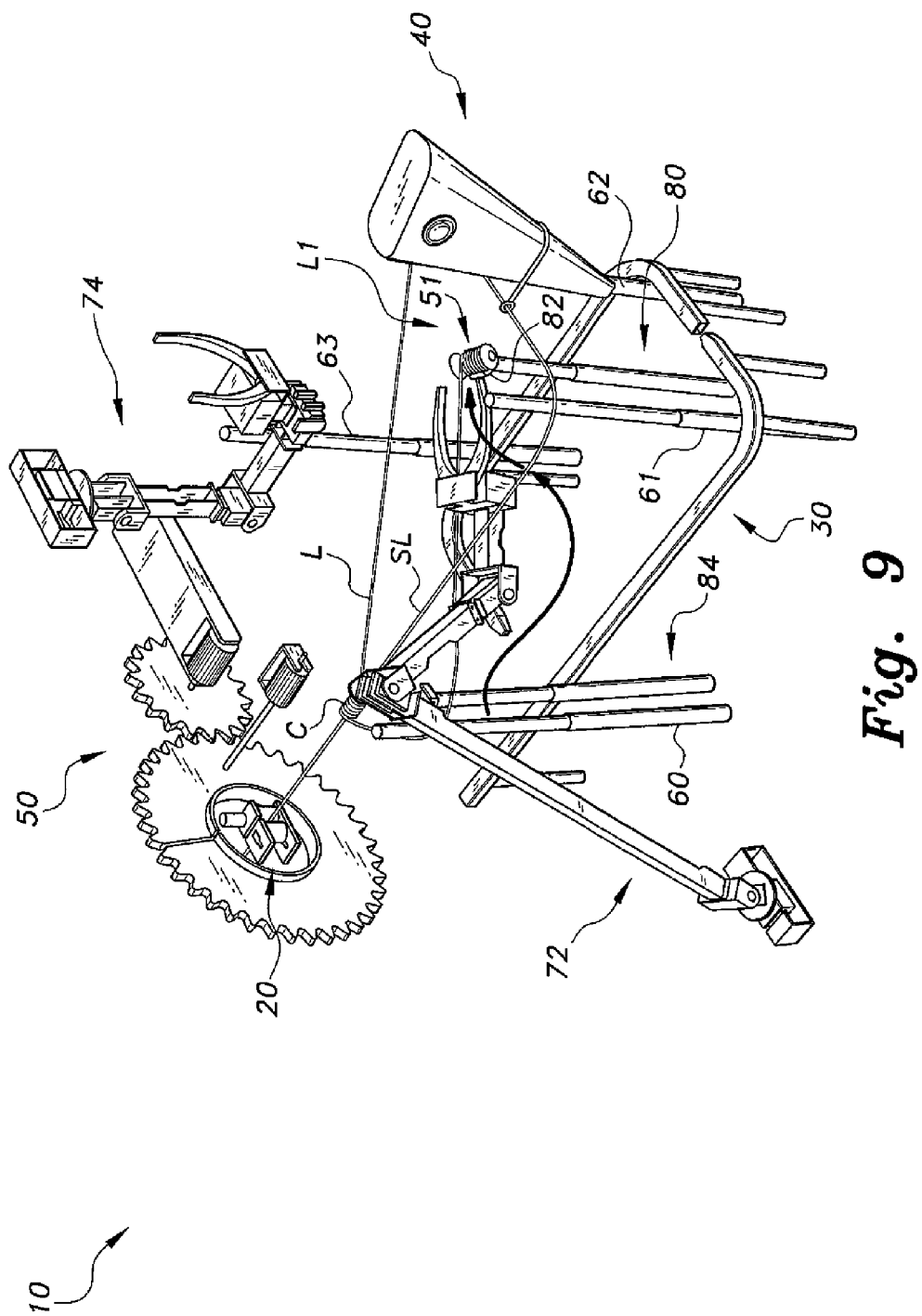
FIG. 9 is detailed perspective view of a final step of forming the first loop in the automatic fish hook tying device shown in FIG. 3 during the process of tying the knot, the communication lines being removed for clarity.
Figure 10:
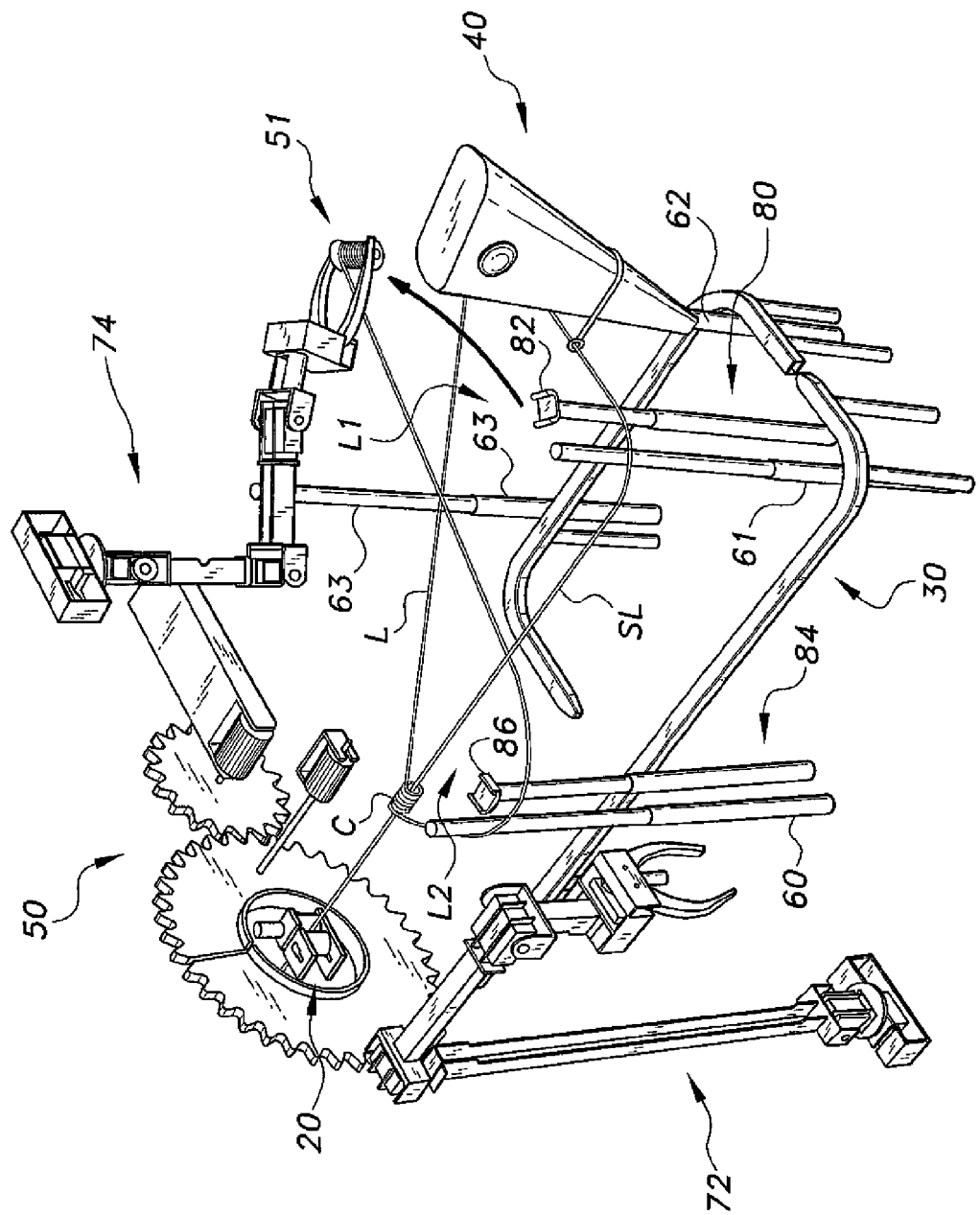
FIG. 10 is a detailed perspective view of an initial step of forming a second loop in the automatic fish hook tying device shown in FIG. 3 during the process of tying the knot, the communication lines being removed for clarity.
Figure 11:
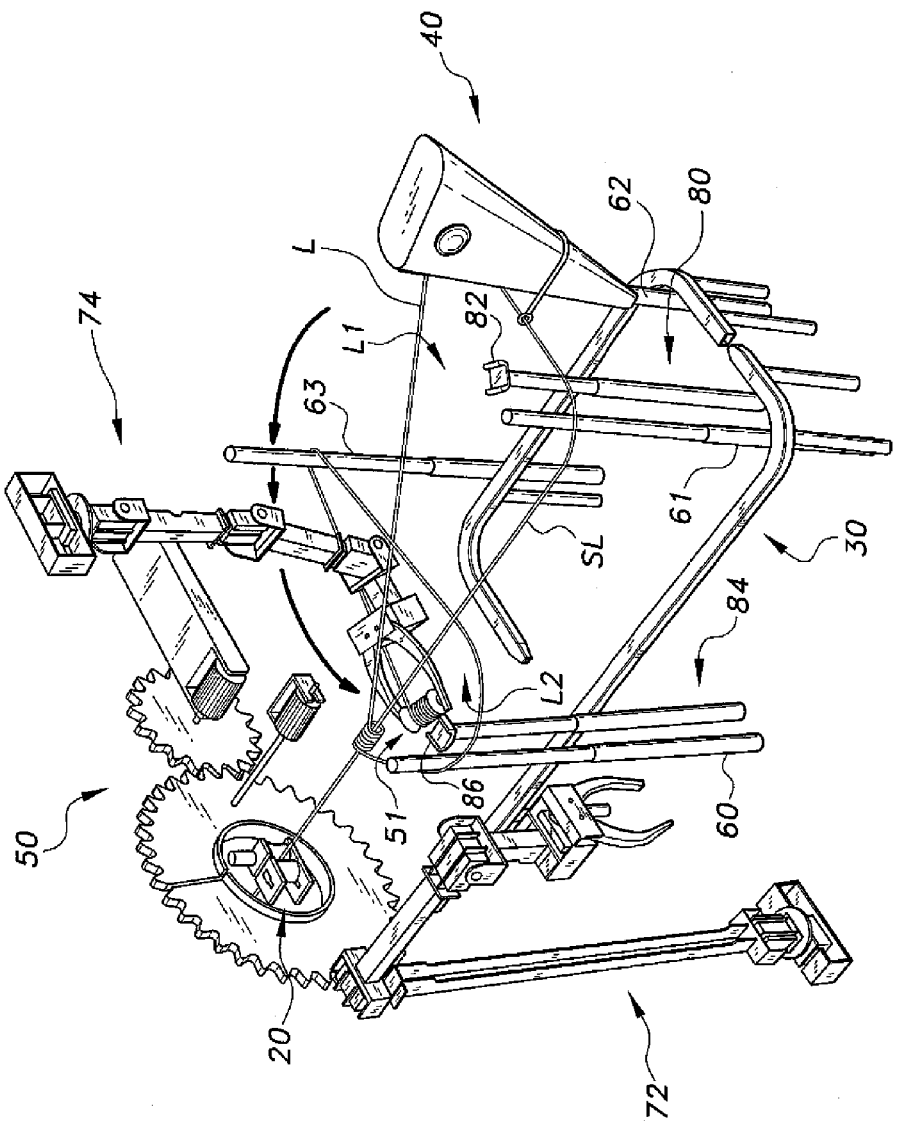
FIG. 11 is a detailed perspective view of a final step of forming the second loop in the automatic fish hook tying device shown in FIG. 3 during the process of tying the knot, the communication lines being removed for clarity.

Referring to FIG. 9, the first manipulator 72 detaches the spool 51 from the motor 52 and places the spool 51 on the first rest station 80 by partially wrapping around the first guide post 60 and looping under the standing line SL. The first manipulator 72 returns to an initial or ready position so as to be unobtrusive to actions from other components within the housing 12. The second manipulator then grasps the spool 51 from the first rest station 80 and maneuvers the spool 51 over the angled portion of the fishing line L, as shown in FIG. 10, to partially wrap around the fourth guide post 63 prior to the spool 51 being placed on the second rest station 84, as shown in FIG. 11. When the spool 51 is seated on the spool rest 86, the automatic fish hook tying device 10 is ready for the final stage of completing the knot. These steps correspond to the step shown in FIG. 2B.

Figure 12:
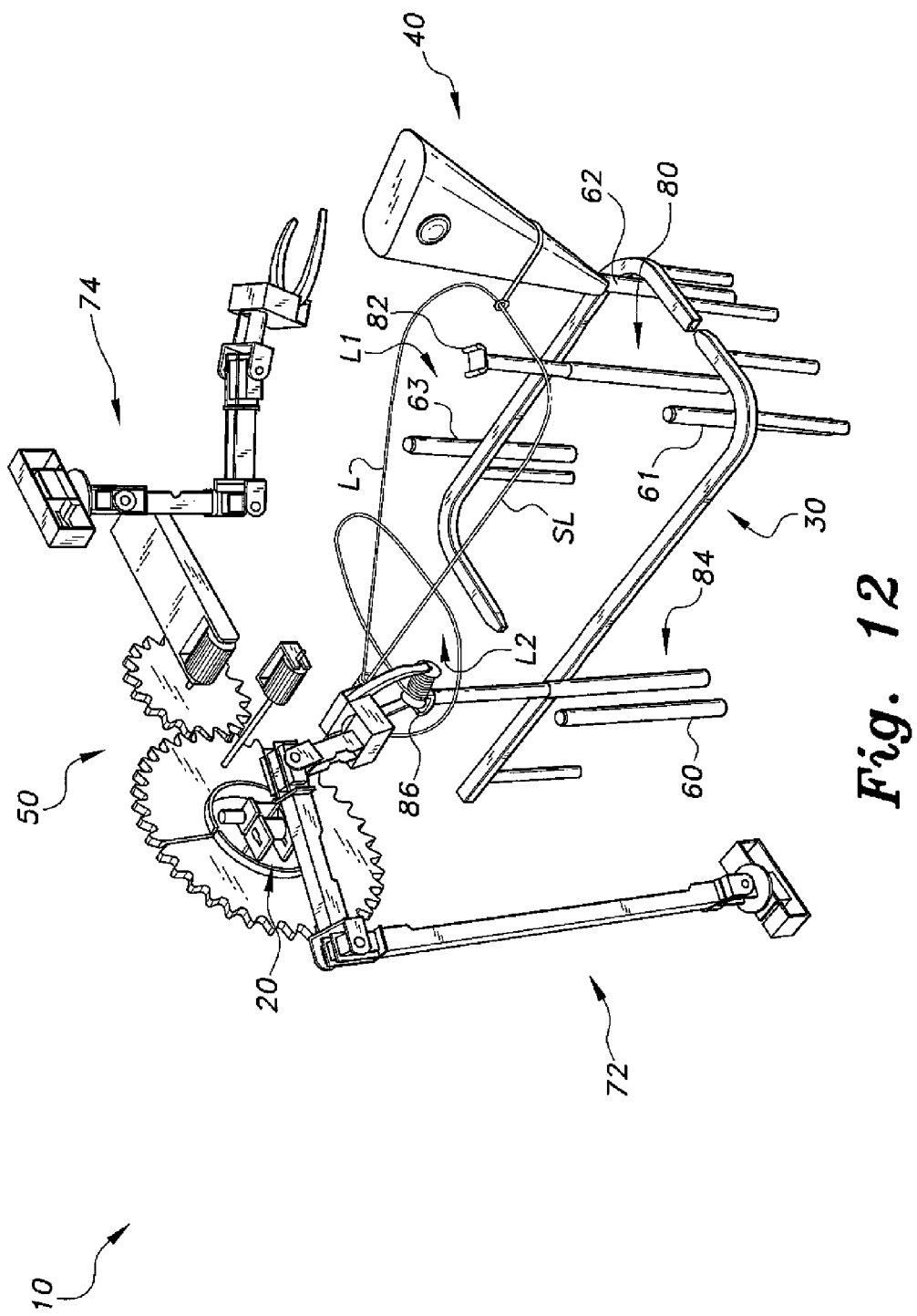
FIG. 12 is a detailed perspective view of an initial step of completing the knot in the automatic fish hook tying device shown in FIG. 3 with communication lines removed for clarity.

Once positioned in the manner described above, the portion of the fishing line L wrapped around the first guide post 60 and the fourth guide post 63 forms a second loop L2 similar to that shown in FIG. 2C. At this point, the second manipulator 74 can be returned to an initial or ready position while the guide posts 60, 61, 62, 63 are lowered to release the fishing line L. During the movements of the second manipulator 74 and the guide posts 60, 61, 62, 63 or after, the first manipulator 72 grasps the spool 51 from the spool rest 86 on the second rest station 84, as shown in FIG. 12, and pulls the spool 51 above the plane of the second loop L2 and commences to tighten the tie formed by the maneuvering of the spool 51 between the first rest station 80 and the second rest station 84 and under and over the first loop L1. This corresponds to the step shown in FIG. 2C. This tightening can be facilitated by the first manipulator 72 carrying the spool 51 towards the spool motor 52 for reattachment thereto and/or reverse feeding of the fishing line L by reverse rotation of the feed rollers 21, the tightening corresponding to the step shown in FIG. 2D. When the knot has been completed, the coils C around the standing line SL at the beginning of the knot tying process will have traveled towards the eye HE of the hook H and formed a secure knot.

The knot tying process is complete when the spool 51 is reattached to the spool motor 52. However, an excess length EL of fishing line L near the free end remains. To facilitate removal of this excess, the automatic fish hook tying device 10 can be provided with a cutter assembly 90 mounted to the top of the housing 12 for easy access by the user.

Figure 14:
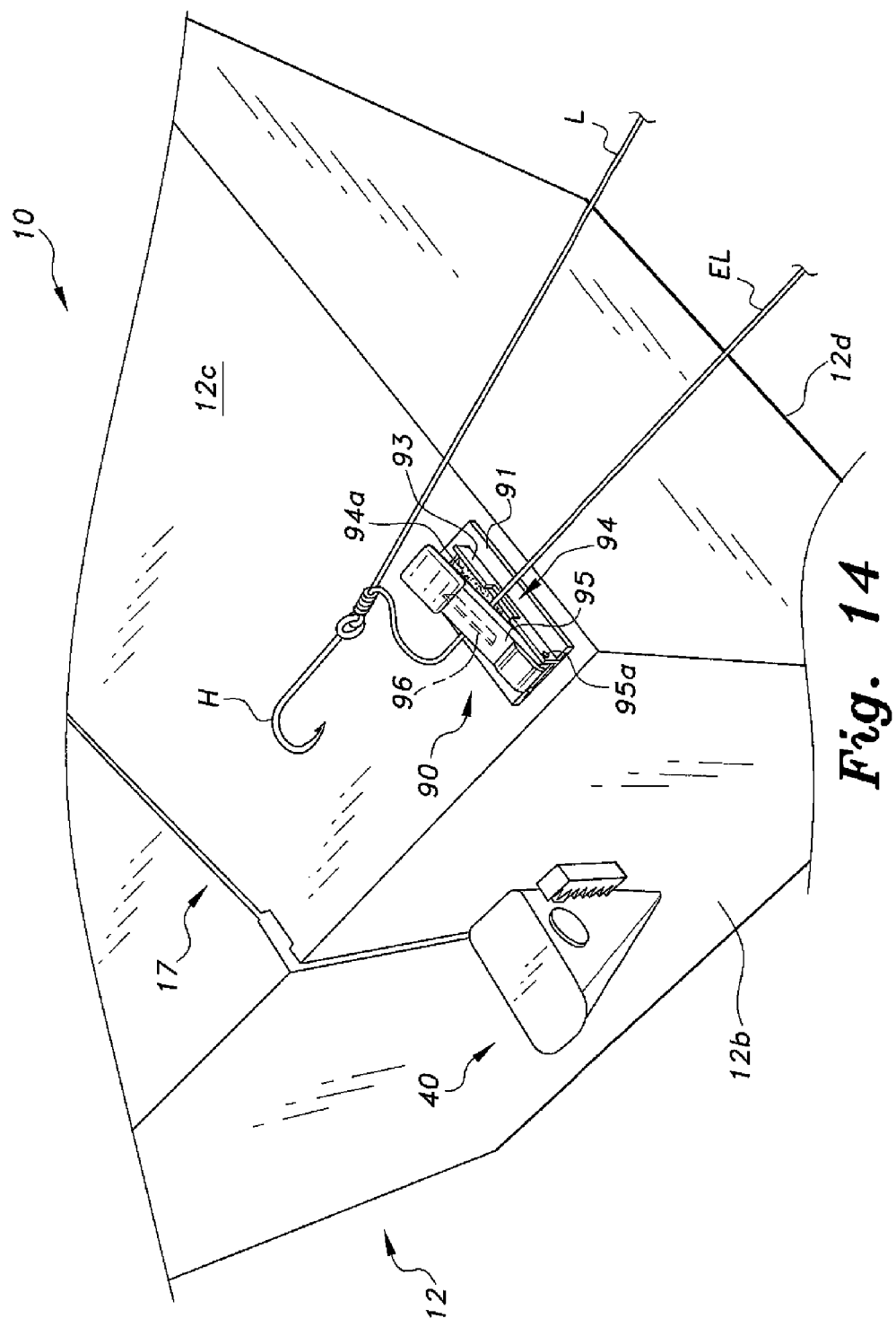
FIG. 14 is a detailed perspective view of a cutter assembly for the automatic fish hook tying device shown in FIG. 1.

As best seen in FIGS. 1 and 14, the cutter assembly 90 includes an elongate base 91 attached to the housing 12 and an elongate pivoting lever 95 mounted to one end of the base 91. In an embodiment, the base 91 can be constructed as a generally elongate, rectangular U-channel beam with an open or closed end. A guide cutout or notch 94 is formed on the sidewalls 93 of the base 91, and the guide notches 93 function as guides for threading the excess length L therethrough for subsequent cutting. The base 91 can also be provided with a cutting mat 94a lying on the bottom of the base 91.

The lever 95 is similarly constructed as the base 91 as a generally elongate, rectangular U-channel beam with an open or closed end. The lever 95 is pivotally connected to the base 91 at a pivot 95a, and the pivot 95a is preferably biased so as to maintain the lever 95 in a normally open position. In an embodiment, the lever 95 is preferably smaller in dimension so that the lever 95 can be nested within the base 91 when the lever 95 is in a fully closed position. The lever 95 includes an elongate cutter 96 extending downwardly from the interior of the lever 95.

In use, the user removes the assembled fish hook H with the line L knotted thereon by threading the line L upwardly through the slot 17. It is noted that at this point, the radial slot 55b of the driven winding gear 55 is aligned with a portion of the slot 17 extending along the sidewall 12a of the housing 12. Thus, the radial slot 55b permits removal of the fishing line L without disassembling the housing 12. Once removed, the user places the excess portion or length EL of the line L to be cut through the guide notches 94, and this portion can be manually held to fix the position of the excess or left as is. The user then pivots the lever 95 down towards the base 91 to cut the desired length of excess with the cutter 96.

The cutting mat 94a acts as a resilient bed for the cutter 96 to act against and perform a cut. As such, the cutting mat 94 is preferably constructed from resilient, self-healing materials such as neoprene, rubber, elastomer, or any material that is durable enough for repeated cuts without significant impact to the integrity of the material. Additionally, a resilient material such as rubber provides a gripping surface to stabilize the excess length EL of fishing line L during the cut.

Having described the automatic fish hook tying device 10, the following reiterates the operation of the automatic fish hook tying device 10. Initially, the user positions the fish hook H so that the eye HE thereof extends into the gap 33 between the first guide rail section 31 and the second guide rail section 34. The fish hook holder 41 is vertically adjusted so as to fix the desired position of the fish hook H hooked thereon.

The fishing line L is fed through the feeding assembly 20 via the terminal end of the slot 17 on the sidewall 12a of the housing 12. The feed rollers 21 positively feed the fishing line L through the first guide rail section 31 so that the leading end of the fishing line L travels or threads through the eye HE and into the second guide rail section 34.

The fishing line L is continuously fed until the leading end of the fishing line L passes through the terminal or tapered end of the second guide rail section 34 and into one of the gaps in the cage shaft 51a of the spool 51. At this point, the spool motor 52 is activated to rotate the spool 51 and wind the fishing line L around the cage shaft 51a a preselect number of revolutions to accumulate a suitable length of the fishing line L secured onto the spool 51.

Then the first guide rail section 31 and the second guide rail section 34 are lowered towards the interior floor of the housing 12 by the telescoping support posts 36 to move the guide rail sections 31, 34 to a position where the guide rail sections 31, 34 will not obstruct subsequent processes of the automatic fish hook tying device 10. The lowering of the guide rail sections 31, 34 causes the respective first guide rail section cover 32 and the second guide rail section cover 35 to forcibly open by the stationary fishing line L abutting against the guide rail section covers 32, 35, the fishing line L being held in a stationary position by the spool 51 and the feed rollers 21. Though the fishing line L is not supported from beneath by the lowering guide rail sections 31, 34, the fishing line L is still maintained in the elevated position by the fishing line L becoming wrapped and taut around the second guide post 61 and third guide post 62.

Once the guide rail sections 31, 34 have been moved out of the way, the drive motor 57 is activated to drive the drive gear 56 so as to enable rotation of the driven winding gear 55. Rotation of the driven winding gear 55 winds the fishing line L around the standing line SL to thereby form coils C due to the eccentric or offset position of the axially extending first beam 54 with the spool 51 detachably mounted thereon, as shown in FIG. 8. During this process, the fishing line L is still maintained in the elevated position by the fishing line L becoming wrapped and taut around the second guide post 61 and third guide post 62 though support of the fishing line L from underneath has been removed by the lowered guide rail sections 31, 34. The second guide post 61 and the third guide post 62 assists in forming the general first loop L1.

At this point, the first manipulator 72 grabs the spool 51 and detaches the spool 51 from the motor 52. The first manipulator 72 then carries the spool 51 around the first guide post 60 and under the standing line SL to place the spool 51 onto the spool rest 82 of the first resting station 80, as shown in FIG. 9. The second manipulator 74 picks up the spool 51 from the first resting station 80 and carries the same over the angled portion of the fishing line L, thus threading the trailing fishing line L through the first loop L1, to wrap around the fourth guide post 63. The second manipulator 74 further carries the spool 51 under the angled portion of the fishing line L to place the spool 51 onto the spool rest 86 of the second resting station 84. The portion of the fishing line L wrapping around the first guide post 60 and the fourth guide post 63 forms the second loop L2.

Figure 13:
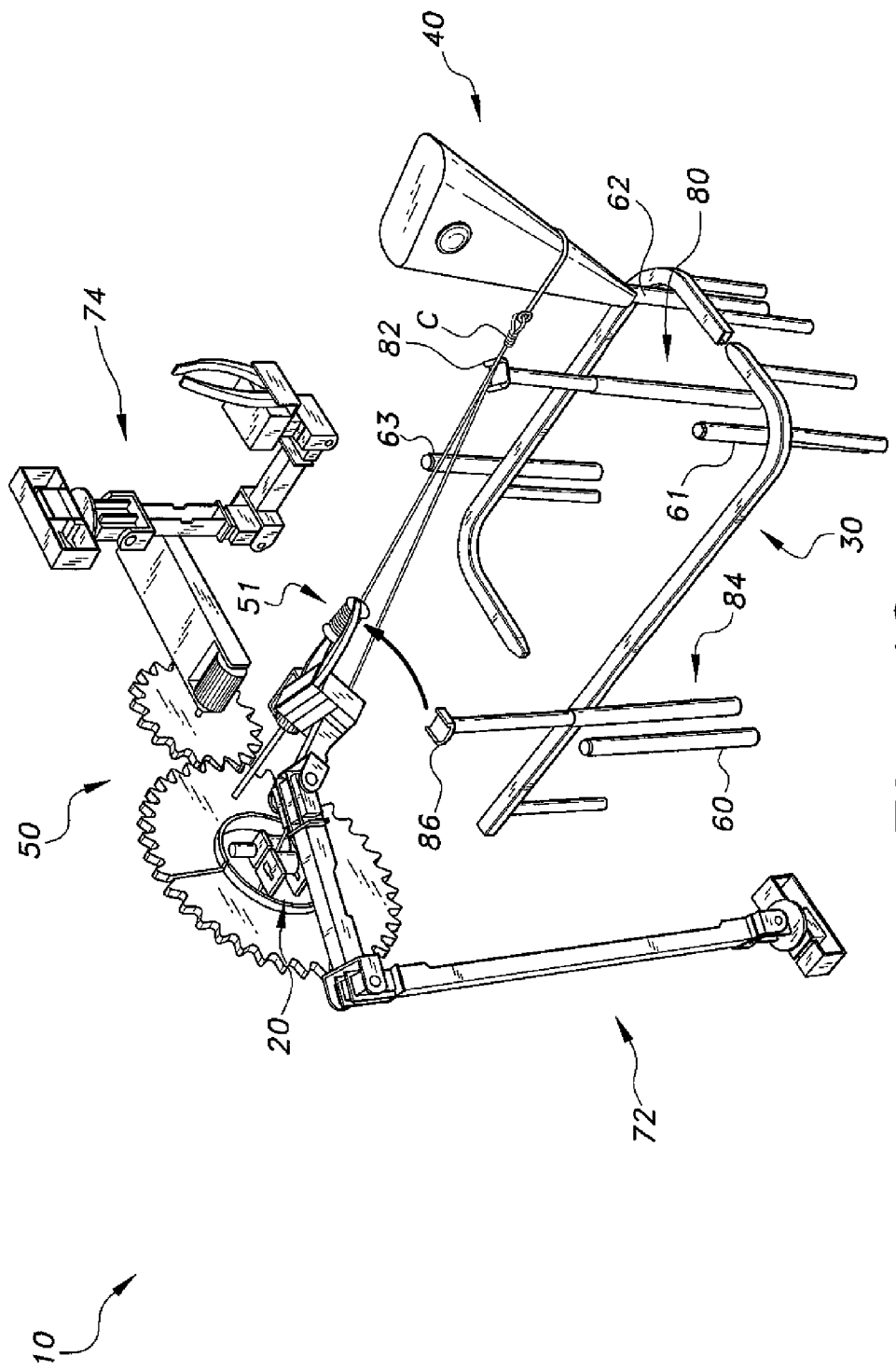
FIG. 13 is a detailed perspective view of a final step of completing the knot in the automatic fish hook tying device shown in FIG. 3 with communication lines removed for clarity.

Once the spool 51 has been placed onto the second resting station 84, the guide posts 60, 61, 62, 63 are lowered to free the fishing line L from any constraints and in preparation for the knot finishing step. The first manipulator 72 maneuvers over the top of the second loop L2 to pick up the spool 51 from the second resting station 84, as shown in FIG. 12. Then the first manipulator 72 carries the spool 51 upwardly and towards the motor 52 to simultaneously tighten the knot and reattach the spool 51 onto the motor 52, as shown in FIG. 13. The tied fish hook H is manually removed from the housing 12 by threading the fishing line L through the elongate slot 17 and the radial slot 55b, the radial slot 55b being collinearly aligned with the elongate slot 17 upon completion of the coil forming process. Any excess length EL can be cut off by the use of the cutter assembly 90 on top of the housing 12.

Thus, it can be seen that the automatic fish hook tying device 10 facilitates easy and automated tying of a relatively complicated knot. Most aspects of the knot tying process are facilitated by the various assemblies described above with minimal intervention by the user except for initial preparation and removal of the completed fishing hook H tied with the desired knot.

It is to be understood that the present invention is not limited to the embodiments described above, but encompasses any and all embodiments within the scope of the following claims.

We claim:

1. An automatic fish hook tying device, comprising:
    a hollow housing, the housing having an elongate slot formed therein, the slot having opposing ends;
    a fish hook holding assembly coupled to an outer side of the housing near one end of the slot, the fish hook holding assembly adjustably holding a fish hook thereon with an eye of the fish hook extending into an interior of the housing;
    a fishing line feeding assembly coupled to an interior of the housing near an opposite end of the slot;
    a fishing line guide assembly mounted adjacent the fishing line feeding assembly, the fishing line guide assembly defining a curvilinear path to form a general first loop in a knot tying process, the fishing line feeding assembly selectively feeding a fishing line through the fishing line guide assembly and through the eye of the fish hook;
    a winding and spooling assembly mounted inside the housing adjacent the fishing line guide assembly, the winding and spooling assembly having a detachably mounted spool to wind the fishing line thereon and form coils around a standing line of the fishing line;
    a plurality of guide posts disposed around the fishing line guide assembly, the plurality of guide posts enabling formation and maintenance of at least one loop in the knot tying process;
    a manipulator assembly mounted inside the housing, the manipulator assembly moving the spool to form loops and thread the fishing line through the loops to form the knot; and
    a controller communicating with the fishing line feeding assembly, the fishing line guiding assembly, the winding and spooling assembly, and the plurality of guide posts, and the manipulator assembly to control operations thereof in forming and tying the knot.

2. The automatic fish hook tying device according to claim 1, wherein said fish hook holding assembly comprises:
    an elongate fish hook holder slidably mounted to said outer side of said housing, said fish hook holder facilitating adjustable mounting of said fish hook thereon; and
    a position locking mechanism coupled between said fish hook holder and said outer side to lock said fish hook holder in a desired adjusted position.

3. The automatic fish hook tying device according to claim 2, wherein said elongate fish hook holder comprises an elongate wedge block having a sloping edge, said sloping edge having a rounded surface to accommodate curvature of said fish hook to be tied with said knot.

4. The automatic fish hook tying device according to claim 3, wherein said position locking mechanism comprises:
    an elongate adjustment rail mounted adjacent said fish hook holder on said outer side;
    a retractable pin coupled to said fish hook holder, the retractable pin selectively engaging said adjustment rail to lock said fish hook holder in the adjusted position; and
    a button coupled to said retractable pin,
    wherein selective actuation of said button releases said retractable pin from engagement with said adjustment rail to slidably adjust relative position of said fish hook holder for said fish hook.

5. The automatic fish hook tying device according to claim 4, wherein said adjustment rail comprises an elongate rack having a plurality of teeth.

6. The automatic fish hook tying device according to claim 1, wherein said fishing line feeding assembly comprises:
    a feed roller frame mounted inside said housing near said opposite end of the slot;
    at least one pair of driven, rotating feed rollers mounted on said feed roller frame, said at least one pair of feed rollers forming a nip to grab and feed said fishing line towards said fishing line guide assembly; and
    a motor coupled to each said feed roller to positively rotate said at least one pair of feed rollers.

7. The automatic fish hook tying device according to claim 6, further comprising a gripping surface on each feed roller of said at least one pair of feed rollers.

8. The automatic fish hook tying device according to claim 6, further comprising a biasing mechanism coupled to at least one feed roller of said at least one pair of feed rollers, said biasing mechanism maintaining grip on said fishing line being fed by said at least one pair of feed rollers.

9. The automatic fish hook tying device according to claim 8, wherein said biasing mechanism comprises:
    an elongate slot on said frame;
    an abutment block slidably mounted in said elongate slot, said abutment block supporting a shaft of a corresponding feed roller of said at least one pair of feed rollers; and
    a spring coupled to said abutment block, said spring normally biasing said abutment block against said shaft.

10. The automatic fish hook tying device according to claim 1, wherein said fishing line guide assembly comprises:
    a first guide rail section extending along one side of said housing from said fishing line feeding assembly towards said fish hook holding assembly, said first guide rail section forming about one half of said first loop;
    a second guide rail section extending along an opposite side of said housing from near said fish hook holding assembly towards said winding and spooling assembly, said second guide rail section spaced from said first guide rail section to define a gap between an exit end of said first guide rail section and an entry end of said second guide rail section, said eye of said fish hook extending into said gap to facilitate threading of said fishing line through said eye as said fishing line travels between said first guide rail section and said second guide rail section; and a plurality of telescoping support posts mounted to each said first guide rail section and said second guide rail section, said plurality of telescoping posts selectively raising said first guide rail section and said second guide rail section to an elevated position for guiding said fishing line being fed by said fishing line feeding assembly and lowering said first guide rail section and said second guide rail section to free said fed fishing line to further the knot tying process.

11. The automatic fish hook tying device according to claim 10, wherein each said first guide rail section and said second guide rail section comprises an elongate, curvilinear rail having an open channel and a pivotal cover covering said open channel, said cover being normally closed to confine movement of said fishing line and open when said fishing line abuts against said cover as said first guide rail section and said second guide rail section are lowered by said plurality of telescoping support posts.

12. The automatic fish hook tying device according to claim 1, wherein said winding and spooling assembly comprises:
    a driven winding gear rotatably mounted inside the housing near the fishing line guide assembly;
    an elongate first beam extending axially from one side of said driven winding gear, the elongate first beam being positioned at an eccentric axis from an axis of said driven winding gear;
    a spool motor coupled to said first beam, said spool being detachably mounted to said spool motor to selectively wind a select length of said fishing line onto said spool as said fishing line exits said fishing line guide assembly;
    an elongate second beam mounted inside said housing;
    a drive motor coupled to said second beam; and
    a drive gear coupled to said drive motor, said drive gear intermeshed with said driven winding gear to rotate said driven winding gear upon selective activation of said drive motor,
    wherein rotation of said driven winding gear by said drive gear forms a plurality of coils around a standing line of said fishing line due to said spool revolving around said standing line.

13. The automatic fish hook tying device according to claim 12, wherein said spool comprises:
    a pair of spaced and opposing hubs; and
    a cage shaft supported between said opposing hubs, said cage shaft having a plurality of slats arranged in a circular pattern to form a generally cylindrical shaft with gaps between said slats.

14. The automatic fish hook tying device according to claim 1, wherein said manipulator assembly comprises:
    a first manipulator mounted to a floor of said housing, said first manipulator grasping said spool and moving said spool within a given operational zone;
    a second manipulator mounted to a ceiling of said housing, said second manipulator grasping said spool and moving said spool within another given operational zone; and
    at least a pair of resting stations mounted to the floor of said housing, said at least a pair of resting stations defining temporary rests for said spool as said spool is being carried by said first manipulator or said second manipulator.

15. The automatic fish hook tying device according to claim 14, wherein each said first manipulator and said second manipulator comprises:
    a robotic arm comprising:
        a base;
        a turntable coupled to said base;
        a first servomotor mounted to said turntable;
        an elongate first member pivotally mounted to said first servomotor at one end thereof, said turntable rotating said first member about a vertical axis, said first servomotor facilitating pivotal movements of said first member about a horizontal axis;
        a second servomotor mounted to an opposite end of said first member;
        an elongate second member pivotally mounted to said second servomotor at one end thereof, said second servomotor facilitating pivotal movement of said second member with respect to said first member;
        a third servomotor mounted to an opposite end of said second member;
        an elongate third member pivotally mounted to said third servomotor at one end thereof, said third servomotor facilitating pivotal movements of said third member with respect to said second member; and
        a handling mechanism mounted to an opposite end of said third member, said handling mechanism having a drive assembly and a pair of pincers coupled to said drive assembly, said drive assembly operating said pincers to selectively grab and release said spool as each first manipulator and second manipulator grabs and moves said spool from one location to another.

16. The automatic fish hook tying device according to claim 14, wherein each said resting station comprises an elongate, telescoping resting post and a spool rest mounted on top of said resting post, said spool rest having an elongate, open-ended trough for supporting said spool thereon.

17. The automatic fish hook tying device according to claim 1, further comprising a cutter assembly mounted to said housing, the cutting assembly cutting excess length of fishing line from a tied fish hook.

18. The automatic fish hook tying device according to claim 17, wherein said cutter assembly comprises:
    an elongate base;
    an elongate lever pivotally mounted to said base at one end; and
    an elongate cutter mounted inside said lever.

19. A method of automatically tying a fishing line to a fish hook, comprising the steps of:
    providing an automatic fish hook tying device, the automatic fish hook tying device comprising:
        a hollow housing, the housing having an elongate slot formed thereon, the slot having opposing ends;
        a fish hook holding assembly coupled to an outer side of the housing near one end of the slot, the fish hook holding assembly adjustably holding a fish hook thereon with an eye of the fish hook extending into an interior of the housing;
        a fishing line feeding assembly coupled to the interior of the housing near the opposite end of the slot;
        a fishing line guide assembly mounted near the fishing line feeding assembly, the fishing line guide assembly defining a curvilinear path to form a general first loop in a knot tying process, the fishing line feeding assembly selectively feeding a fishing line through the fishing line guide assembly and through the eye of the fish hook;

a winding and spooling assembly mounted inside the housing near the fishing line guide assembly, the winding and spooling assembly having a detachably mounted spool to wind the fishing line thereon and form coils around a standing line of the fishing line;

a plurality of guide posts disposed around the fishing line guide assembly, the plurality of guide posts enabling formation and maintenance of at least one loop in the knot tying process;

a manipulator assembly mounted inside the housing, the manipulator assembly carrying the spool from one place to another to form loops and thread the fishing line through the loops to form the knot; and a controller communicating with the fishing line feeding assembly, the fishing line guiding assembly, the winding and spooling assembly, and the plurality of guide posts, and the manipulator assembly to control operations thereof in forming and tying the knot;

mounting the fish hook onto the fish hook holding assembly to hold the fish hook at a desired position with the eye extending into the housing;

operating the controller to begin the knot tying process;

feeding the fishing line through fishing line feeding assembly and into the fishing line guide assembly;

guiding the fishing line through the fishing line guide assembly to thread the feeding fishing line through the eye of the hook and towards the winding and spooling assembly;

winding the fishing line around the spool;

forming coils around the standing line by revolving the spool around the standing line;

lowering the fishing line guide assembly to free the fishing line leaving the fishing line wrapped around a second guide post and a third guide post to form a first loop;

providing a pair of resting stations, a first resting station near the fish hook holding assembly and a second resting station near the winding and spooling assembly;

detaching the spool and moving the spool around a first guide post under the standing line to rest on the first resting station;

moving the spool from the first resting station by threading a trailing fishing line over an angled portion of the fishing line and wrapped around a fourth guide post to rest the spool on the second resting station, the fishing line wrapped around the first guide post and fourth guide post forming a second loop;

picking up the spool from the second resting station to thread the fishing line through the second loop from under the standing line to above the standing line; and pulling the spool to reattach the spool and complete the knot.

20. The method of automatically tying a fishing line to a fish hook according to claim 19, further comprising the steps of:

removing a tied fish hook from said housing by threading said fishing line through said slot on said housing; and providing a cutter assembly to cut excess length of fishing line from said tied fish hook.

* * * * *